(12) United States Patent
Pinayour Chandrasekaran et al.

(10) Patent No.: US 11,778,477 B2
(45) Date of Patent: Oct. 3, 2023

(54) BASE STATION RESOURCE SELECTION

(71) Applicant: QUALCOMM Incorporated, San Diego, CA (US)

(72) Inventors: Sarath Pinayour Chandrasekaran, Hyderabad (IN); Satish Kumar, Hyderabad (IN); Loksiva Paruchuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 17/304,196

(22) Filed: Jun. 16, 2021

(65) Prior Publication Data
US 2022/0408270 A1 Dec. 22, 2022

(51) Int. Cl.
| | | |
|---|---|---|
| *H04W 16/10* | (2009.01) | |
| *H04W 72/04* | (2023.01) | |
| *H04W 48/16* | (2009.01) | |
| *H04W 72/0446* | (2023.01) | |
| *H04W 72/0453* | (2023.01) | |
| *H04W 24/10* | (2009.01) | |
| *H04W 72/23* | (2023.01) | |

(52) U.S. Cl.
CPC .......... *H04W 16/10* (2013.01); *H04W 24/10* (2013.01); *H04W 48/16* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2018/0227777 A1* | 8/2018 | Sun ....................... | H04L 5/0094 |
| 2019/0166593 A1* | 5/2019 | Liao ..................... | H04W 72/20 |
| 2020/0053758 A1* | 2/2020 | Hosseini ................ | H04L 5/005 |
| 2020/0120659 A1* | 4/2020 | Wang .................... | H04L 5/0053 |
| 2020/0322109 A1* | 10/2020 | Yu ........................ | H04L 5/0051 |
| 2020/0359384 A1* | 11/2020 | Da ..................... | H04W 72/0453 |
| 2021/0007085 A1* | 1/2021 | Lin ....................... | H04L 5/0053 |
| 2021/0235419 A1* | 7/2021 | Si ......................... | H04W 16/14 |
| 2022/0322381 A1* | 10/2022 | Zhang .............. | H04W 72/1263 |
| 2022/0368498 A1* | 11/2022 | Sun ...................... | H04L 5/0035 |
| 2022/0368500 A1* | 11/2022 | Liu .................... | H04W 72/044 |
| 2023/0071462 A1* | 3/2023 | Su .................... | H04W 72/0453 |

\* cited by examiner

*Primary Examiner* — Duc T Duong
(74) *Attorney, Agent, or Firm* — Harrity & Harrity, LLP (57) ABSTRACT

Various aspects of the present disclosure generally relate to wireless communication. In some aspects, a base station may extract information from a neighboring base station with cell coverage that overlaps cell coverage of the base station. The base station may determine, from the information, one or more locations of control resource sets (CORESETs) used by the neighboring base station. The base station may select resources that do not overlap with the CORESETs used by the neighboring base station. The base station may transmit a communication using the selected resources. Numerous other aspects are described.

28 Claims, 5 Drawing Sheets

BASE STATION RESOURCE SELECTION

FIELD OF THE DISCLOSURE

Aspects of the present disclosure generally relate to wireless communication and to techniques and apparatuses for configuring a base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes extracting information from a neighboring base station with cell coverage that overlaps cell coverage of the base station, determining, from the information, one or more locations of control resource sets (CORESETs) used by the neighboring base station, selecting resources that do not overlap with the CORESETs used by the neighboring base station, and transmitting a communication using the selected resources.

In some aspects, a base station for wireless communication includes memory and one or more processors coupled to the memory, the memory including instructions executable by the one or more processors to cause the base station to extract information from a neighboring base station with cell coverage that overlaps cell coverage of the base station, determine, from the information, one or more locations of CORESETs used by the neighboring base station, select resources that do not overlap with the CORESETs used by the neighboring base station, and transmit a communication using the selected resources.

In some aspects, a non-transitory computer-readable medium stores one or more instructions for wireless communication, the one or more instructions, when executed by one or more processors of a base station, cause the base station to extract information from a neighboring base station with cell coverage that overlaps cell coverage of the base station, determine, from the information, one or more locations of CORESETs used by the neighboring base station, select resources that do not overlap with the CORESETs used by the neighboring base station, and transmit a communication using the selected resources.

In some aspects, an apparatus for wireless communication includes means for extracting information from a neighboring base station with cell coverage that overlaps cell coverage of the base station, means for determining, from the information, one or more locations of CORESETs used by the neighboring base station, means for selecting resources that do not overlap with the CORESETs used by the neighboring base station, and means for transmitting a communication using the selected resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
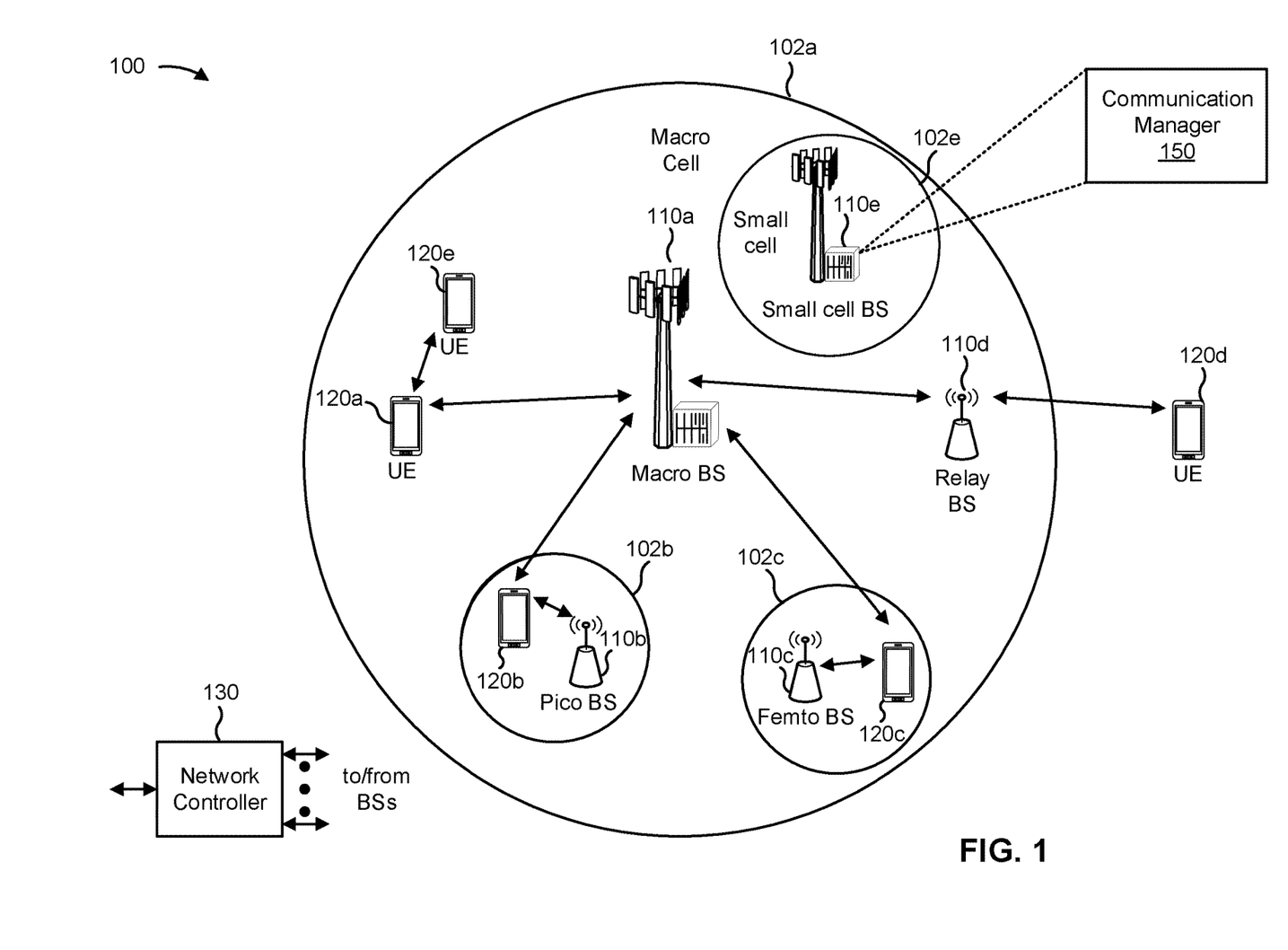
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein. BS 110e may be a small cell BS that serves a small cell 102e that overlaps in coverage with a macro cell 102a.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the base station 110 may include a communication manager 150. As described in more detail elsewhere herein, the communication manager 150 may extract information from a neighboring base station with cell coverage that overlaps cell coverage of the base station. The communication manager 150 may determine, from the information, one or more locations of control resource sets (CORESETs) used by the neighboring base station. The communication manager 150 may select resources that do not overlap with the CORESETs used by the neighboring base station and transmit a communication using the selected resources. Additionally, or alternatively, the communication manager 150 may perform one or more other operations described herein.

As indicated above, FIG. 1 is provided as an example. Other examples may differ from what is described with regard to FIG. 1.

Figure 2:
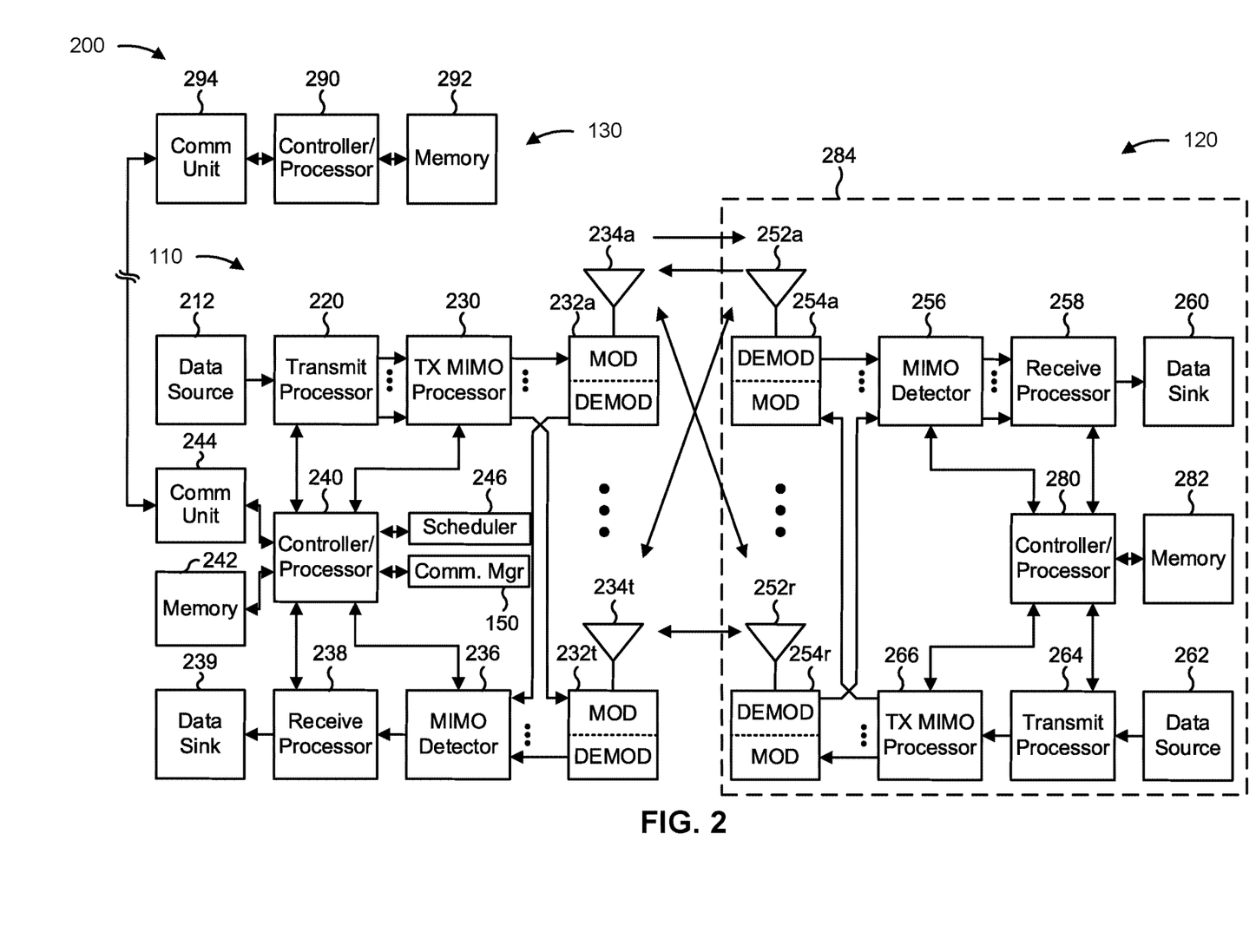
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-5).

Controller/processor 240 of base station 110 and/or any other component(s) of FIG. 2 may perform one or more techniques associated with selecting resources for a base station, as described in more detail elsewhere herein. For example, controller/processor 240 of base station 110 and/or any other component(s) of FIG. 2 may perform or direct operations of, for example, process 400 of FIG. 4 and/or other processes as described herein. Memory 242 may store data and program codes for base station 110. In some aspects, memory 242 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, may cause the one or more processors and/or the base station 110 to perform or direct operations of, for example, process 400 of FIG. 4, and/or other processes as described herein. In some aspects, executing instructions may include running the instructions, converting the instructions, compiling the instructions, and/or interpreting the instructions, among other examples.

In some aspects, the base station 110 includes means for extracting information from a neighboring base station with cell coverage that overlaps cell coverage of the base station, means for determining, from the information, one or more locations of CORESETs used by the neighboring base station, means for selecting resources that do not overlap with the CORESETs used by the neighboring base station, and/or means for transmitting a communication using the selected resources. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
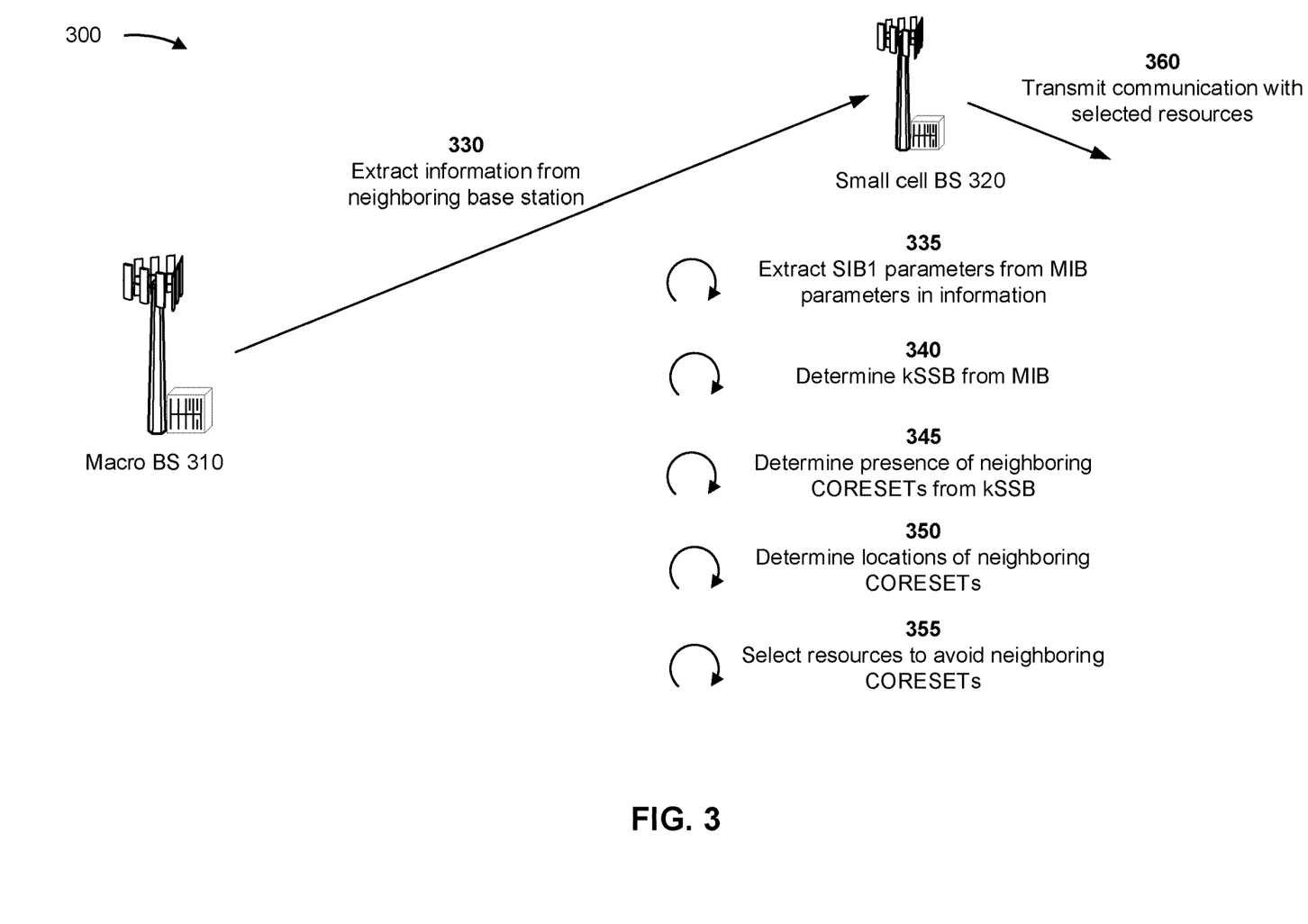
FIG. 3 is a diagram illustrating an example of selecting resources for a base station, in accordance with the present disclosure.

FIG. 3 is a diagram illustrating an example 300 of selecting resources for a base station, in accordance with the present disclosure. As shown in FIG. 3, a macro base station (BS) 310 (e.g., BS 110a) and a small cell BS 320 (e.g., BS 110e) may overlap in cell coverage and may communicate with one another.

In 5G NR, a master information block (MIB) and a system information block one (SIB1) may carry a common configuration of a physical broadcast channel (PBCH) and physical downlink control channels (PDCCHs) that play a role in downlink synchronization, attachment procedures (e.g., random access channel msg1-msg4), and paging-idle operations. A small cell BS, such as small cell BS 320, may operate in a hyper dense network amidst multiple other neighboring BSs. If the MIB and SIB1 configurations are not systematically planned, there may be multiple issues with resource usage by the small cell BS. For example, there may be interference in an initial downlink bandwidth part (BWP) or uplink BWP resulting in a PDCCH, a physical downlink shared channel (PDSCH), or a physical uplink shared channel (PUSCH) cyclic redundancy check (CRC) error due to signal-to-noise ratio (SNR) degradation.

Furthermore, DMRS symbols may be quadrature phase shift key (QPSK) modulated so that when a first DMRS symbol is different between two base stations, the difference may result in interference from a neighboring base station data symbol with a modulation order as high as 256 quadrature amplitude modulation (256-QAM). This may degrade the channel estimation. Another issue may involve false downlink control information (DCI). A CORESET #0 (CORESET0) carried by a MIB is scrambled by a cell identifier (ID). That is, the CORESET0 is associated with the cell ID. By contrast, for a common CORESET defined through PDCCH-ConfigCommon of a SIB1, pdcch-DMRS-ScramblingID is configurable. If pdcch-DMRS-ScramblingID is the same between base stations, then the magnitude of the interference would be high and result in false DCI.

In other words, a small cell base station in overlapping cell coverage with a neighboring base station may experience interference and/or resource collisions, which may waste processing resources and signaling resources. Because small cell base stations are "plug and play" devices, it would not be cost-effective for an operator to manually configure or update a configuration for each small cell base station so as to avoid the interference and/or collisions from neighboring base stations that overlap cell coverage.

According to various aspects described herein, a small cell base station (e.g., 5G NR base station) may autonomously configure itself by extracting information about a neighboring base station (e.g., macro base station with overlapping cell coverage) and selecting resources based at least in part on the extracted information. For example, the small cell base station may extract the information via a network listening (NL) scan. The information may include parameters by which the small base station may derive time-frequency locations of CORESETs used by the neighboring base station. The small cell base station may use the time-frequency locations of the CORESETs and/or other information to optimize a configuration of the small cell base station. This may include selecting resources that avoid the locations of the CORESETs of the neighboring base station. Both base stations may conserve processing resources and signaling resources by avoiding interference, poor channel estimation, SNR degradation, performance degradation (e.g., CRC errors), and/or multiple retransmissions. The base stations may also avoid false DCI caused by overlapping resource block (RB) allocations and scrambling IDs that are for a common radio network temporary identifier (RNTI). In some aspects, the small cell base station may select resources for self-configuration without changes to a current standard.

Example 300 shows an example of a small cell BS 320 that may autonomously configure itself. As shown by reference number 330, the BS 320 may extract information from a neighboring base station with overlapping cell coverage, such as macro BS 310. The BS 320 may perform an NL scan or otherwise receive the information about the BS 310 (e.g., via an interface or an integrated access backhaul (IAB)). The information may include multiple parameters, such as parameters from a MIB. The MIB parameters may include at least subCarrierSpacingCommon, ssb-SubcarrierOffset, dmrs-TypeA-Position, and pdcch-ConfigSIB1. The parameter ssb-SubcarrierOffset may be or may help to indicate a parameter kSSB. The parameter kSSB may be a 5-bit value that indicates a starting point of an SSB in the frequency domain, which may convey a presence of CORESET0.

As shown by reference number 335, the BS 320 may extract information from BS 310 and use MIB parameters in the information (e.g., PBCH) to obtain system information block one (SIB1) parameters. The parameter kSSB from the MIB may indicate if parameter pdcch-ConfigSIB1 is carrying a CORESET0 (PDCCH). The parameter pdcch-ConfigSIB1 may be an 8-bit value that indicates a frequency and time location of CORESET0. Other SIB1 parameters may include a frequency band indicator, a duplex mode, and/or synchronization signal block (SSB) indices (SSB candidates or SSB indices from ssb-PositionsInBurst). The SIB1 parameters may also include, in DownlinkConfigCommon, FreqBandIndicatorNR (absolute frequency of the reference resource block (CRB #0)), offsetToPointA (an offset in physical resource blocks (PRBs) between a common resource block (CRB) and a lowest RB of an SSB, or between Point A (lowest subcarrier of CRB #0) and the lowest subcarrier of the lowest PRB of the SSB), offsetTo-Carrier (an offset in frequency domain between Point A and a lowest usable subcarrier), SCS-SpecificCarrier (subcarrierSpacing and carrierBandwidth), initialDownlinkBWP (for a special cell), PDCCH-Config (paging related configuration), and firstPDCCH-MonitoringOccasionOfPO (indicates a first PDCCH monitoring occasion of each paging occasion in a paging frame). The SIB1 parameters may also include ssb-PositionsInBurst and tdd-UL-DL-ConfigurationCommon. A DCI_1_0 transmitted on CORESET0 (PDCCH) may indicate where to decode the SIB1 on the PDSCH.

As shown by reference number 340, the BS 320 may determine a value for kSSB (a subcarrier offset between the lowest subcarrier of the CRB and the first or lowest subcarrier of the SSB) based at least in part on the SIB1 parameters. For each neighboring cell such as the BS 310, the BS 320 may find a frequency range (e.g., FR1, FR2) of operation. If the frequency range of the BS 310 is different than the frequency range of the BS 320, the BS 320 may ignore the BS 310 for resource selection. The BS 320 may also determine a duplex mode of operation for the BS 310. For example, if SIB1→ServingCellConfigCommonSIB→TDD-UL-DL-Config IE is present, then the duplex mode is time division duplex (TDD), or unpaired spectrum. If TDD-UL-DL-Config IE is not present, the duplex mode is frequency division duplex (FDD), or paired spectrum.

The BS 320 may use the frequency range of the BS 310 to interpret MIB→subCarrierSpacingCommon. If the frequency range of the BS 310 is FR1, a value of scs15or60 corresponds to a subcarrier spacing (SCS) of 15 kHz, and a value of scs30or120 corresponds to an SCS of 30 kHz. If the frequency range of the BS 310 is FR2, the value scs15or60 corresponds to an SCS of 60 kHz and the value of scs30or120 corresponds to an SCS of 120 kHz. The BS 320 may find a channel bandwidth of the BS 310 by applying values for SIB1→SCS-SpecificCarrier→subcarrierSpacing, CarrierBandwidth that may be found in look up tables, such as technical specification (TS) 38.101-1 Table 5.3.2-1 for FR1 and TS 38.101-2 Table 5.3.2-1 for FR2.

The BS 320 may derive the subcarrier offset (kSSB) from a lowest subcarrier (subcarrier 0) of a CRB to a lowest subcarrier (subcarrier 0) of an SSB. The CRB may be obtained from SIB1→offsetToPointA and four least significant bits (LSB) of kSSB are given by MIB→ssb-SubcarrierOffset. For SSB type-A, most significant bits (MSB) of kSSB may be given by A+5 in a PBCH payload. If ssb-SubcarrierOffset is not provided, the BS 320 may derive kSSB from a frequency difference between the SSB and Point A (lowest usable subcarrier).

As shown by reference number 345, the BS 320 may determine a presence of a CORESET used by the BS 310 based at least in part on the kSSB and/or an interpretation of bits within the MIB, such as MIB→pdcch-ConfigSIB1 (controlResourceSetZero: 4 MSB, searchSpaceZero: 4 LSB). The interpretation of the bits may include three scenarios. In a first scenario, if kSSB<24 (FR1) or kSSB<11 (FR2), a CORESET may be associated with a current SSB and may be provided by pdcch-ConfigSIB1. In a second scenario, when kSSB=24 to 29 (FR1) or kSSB=12 to 13 (FR2), there may be no CORESET associated with the current SSB. The BS 320 may determine a nearest global synchronization channel number (GSCN) of a second SSB having a CORESET set as N_reference_GSCN+N offset GSCN, where N_reference_GSCN may be a GSCN of a first SSB and N offset GSCN may be a GSCN offset provided by TS 38.213-Table 13-16 for FR1 and Table 13-17 for FR2. The BS 320 may detect a second SSB and check if the first scenario is met for a valid CORESET. Otherwise, the BS 320 may ignore the BS 310. In a third scenario, when kSSB=31 (FR1) or kSSB=15 (FR2), there may be no SSB having an associated TypeO-PDCCH coordinated spectrum sharing (CSS) set within a GSCN range (N_reference_GSCN-N_Start_GSCN, N_reference_GSCN+N_End_GSCN), where N_Start_GSCN and N_End_GSCN are respectively determined by controlResourceSetZero and searchSpaceZero in pdcch-ConfigSIB1. The BS 320 may ignore the BS 310 when pdcch-ConfigSIB1=0 or when no CORESET providing an SSB is detected, as per the first scenario.

As shown by reference number 350, if a CORESET of the BS 310 is present, the BS 320 may determine one or more locations of the CORESETs of the BS 310. The BS 320 may apply controlResourceSetZero as an index in one of the Tables 13-1 to 13-10 of TS 38.213 to derive CORESET RB parameters, and these tables may be selected based at least in part on the subCarrierSpacingCommon and the channel bandwidth. The CORESET RB parameters may include an SSB and CORESET multiplexing pattern, an RB offset (with respect to SSB) and a number of RBs, and a number of symbols. The BS 320 may apply searchSpaceZero as an index in one of the Tables 13-11 to 13-15 of TS 38.213 to derive CORESET time domain parameters, and these tables may be selected based at least in part on the SSB and CORESET multiplexing pattern, the frequency range, and the subCarrierSpacingCommon. The CORESET time domain parameters may include a number of search spaces (O and M), to derive a serial frame number (SFN), a slot-offset, and a periodicity based at least in part on a condition in Section 13 of TS 38.213. A first symbol index (relative to an SSB index) may be used along with the number of symbols.

The locations of the CORESETs may include a location of CORESET0 (from time and frequency location information extracted from PDCCH-ConfigSIB1 of the MIB), and the BS 320 may determine the location of the CORESET0 of the BS 310. Note that pdcch-ConfigSIB1 is an 8 bit value, where controlResourceSetZero (4 MSB) provides RB offset, NumRBs, and NumSymbols, and where searchSpaceZero (4 LSB) provides an SFN, a slot, and a location of first symbol.

Note that CORESET0 may also be defined by PDCCH-ConfigCommon in SIB1, and SIB1 may define multiple other CORESETs with different IDs. First, the BS 320 may determine a subcarrier offset between the lowest subcarrier of the CRB to a lowest subcarrier of the SSB based at least in part on the MIB information and the SIB1 information. Second, the BS 320 may detect whether the CORESET0 used by the BS 310 is present based at least in part on the subcarrier offset, a frequency range of operation of the BS 320, and a frequency range of operation of the BS 320. Third, the BS 320 may determine the location of the CORESET0 used by the BS 310 based at least in part on the subcarrier offset, if the CORESET0 used by the BS 310 is present. The SIB1 may provide locations of other possible CORESETs (e.g., via PDCCH-ConfigCommon or PCCH-Config).

As shown by reference number 355, the BS 320 may select resources that avoid the CORESETs of the BS 310. For example, a configuration of the BS 310 may be: FR2, 100 MHz, 66 RBs, SCS=120 kHz, SSB index=0, GSCN=22505, SSB_CRB=38, kSSB=4, pdcch-ConfigSIB1=0, and controlResourceSetZero=0. Accordingly, with index=0 in Table 13-8, offset=0, CORESET RB Start=38, NumRBs=24, NumSymbols=2. If searchSpaceZero=0, with index=0 in Table 13-12, then O=0, M=1, symbol index=0, periodicity=SFN (from 0) and slots=0 and 1. In a first step, the BS 320 may avoid collision over SSB candidates, by selecting SSB candidates that indicate non-overlapping CORESET slots. The BS 320 may try to configure different SSB candidates using ssb-PositionsInBurst. Each SSB candidate may be based on a searchSpaceZero value that indicates unique slots for CORESET0. For example, for SSB index=0, based on a searchSpaceZero value (e.g., 0), CORESET0 may be in Slots #0 and #1, while for SSB index=2, CORESET0 may be in Slots #2 and #3. In other words, changing an SSB index can influence CORESET0 slots.

In a second step, the BS 320 may avoid collisions over CORESET slots. The BS 320 may select a different index from Table 13-12 that provides non-overlapping slots. For example, if index=2, then O=2.5, M=1, symbol index=0, periodicity=even SFN (from 0), and slots=20 and 21. In a third step, the BS 320 may avoid collision over CORESET Symbols. The BS 320 may select a different index from Table 13-12 that provides non-overlapping symbols. For example, index=1/3/5/7 provides a symbol index as {0, if i is even}, {7, if i is odd}, where i is the SSB index. In a fourth step, the BS 320 may avoid collision over CORESET RBs. The BS 320 may select a different index from Table 13-8 that provides non-overlapping RBs. For example, if index=5, then offset=24, CORESET RB Start=14, NumRBs=24, and NumSymbols=2. In other words, the BS 320 may select SSB indices associated with slots that are non-overlapping with slots of the CORESETs of the BS 310.

In a fifth step, it is possible that the fourth step may still result in a partial RB overlap. In such a scenario, the BS 320 may select a different GSCN for the SSB. This may resolve the partial overlap. For example, if GSCN for the BS 310 is 22502 (SSB_CRB=2 and kSSB=4) and index=0 in Table 13-8, then offset=0 and thus CORESET RB Start=2 and NumRBs=24. For a given SSB and CORESET multiplexing pattern=1, only indices 0 to 3 are defined, but indices other than 0 are invalid since the offset will take CORESET outside of a designated bandwidth. The following GSCNs may then be used by the BS 320 to resolve a CORESET RB overlap: GSCN=22504→nSSB CRB=26, kSSB=4→CORESET RB Start=26 and NumRBs=24; GSCN=22505→nSSB CRB=38, kSSB=4→CORESET RB Start=38, and NumRBs=24. By extracting information from the BS 310 and deriving the CORESET locations, the BS 320 may select resources to avoid overlapping with resources of the BS 310.

In some aspects, the information may include a DMRS Type A position (dmrs-TypeA-Position from MIB). The DMRS Type A position may be a position of a first DMRS for a PDSCH or a PUSCH. The BS 320 may select resources such that a DMRS Type A position aligns with a DMRS Type A position of the BS 310. The DMRS Type A position {pos2, pos3} is defined in the MIB and may be applicable to all common or dedicated PDSCH or PUSCH scheduling. The field dmrs-TypeA-Position may only tell a first DMRS symbol, while a total of the DMRS symbols may be based at least in part on a symbol allocation and a dmrs-AdditionalPosition {pos0, pos1, pos2, pos3}.

DMRSs may be used for channel estimation, determining an SNR, and for determining decoding performance. If DMRS Type A position is the same between two BSs, then the first DMRS symbol resource elements (REs) of the BS 320 may overlap with data REs of the BS 310. The DMRS REs may be QPSK modulated so when they interfere with the data REs (with modulation as high as 256-QAM), the DMRSs may be greatly affected and result in a poor channel estimation or CRC errors. The BS 320 may avoid this interference by using the same DMRS Type A position as the BS 310. By aligning the DMRS Type A positions, even if there is interference, the interference may be mostly from DMRS REs, and the magnitude of the interference may be smaller compared to interference at data REs. For example, if the DMRS Type A position of the BS 310 is pos 2 and the DMRS Type A position of the BS 320 is pos 3 (dmrs-AdditionalPosition {pos 0} indicates no additional DMRS symbols), PDSCH/PUSCH start symbol=0, a number of symbols=8, antenna port=#0, and numcdmgroupsw/odata=2, then there may be RE overlap between the BS 310 and the BS 320. For symbol #2, the DMRS of the BS 310 is aligned with the data of the BS 320. For symbol #3, the data of the BS 310 is aligned with the DMRS of the BS 320. This may cause interference. Therefore, the BS 320 may align the DMRS of the BS 320 with the DMRS of the BS 310 by moving the DMRS of the BS 320 to symbol #2 and the data of the BS 320 to symbol #3.

A CORESET may also be defined through a PDCCH common configuration (SIB1) and thus, in addition to a scrambling ID, the BS 320 may extract a CORESET's time (slot and symbols), a frequency location, and/or RBs of the BS 310 and select different resources for the BS 320.

In some aspects, the extracted information may include a physical PDCCH DMRS scrambling identifier ID, a resource block allocation, a slot, and/or symbols used by the BS 310 in a PDCCH common configuration. The BS 320 may select a PDCCH DMRS scrambling ID, a resource block allocation, a slot, and/or symbols that are different than the PDCCH DMRS scrambling ID, the resource block allocation, the slot, and/or the symbols used by the BS 310. For example, a SIB1 configuration used for overriding CORESET0 (configured by MIB) and for configuring an additional common control resource set may be used for a random access response, paging, or system information. The BS 320 may extract a PDCCH time and frequency location for CORESET0 for the BS 310, as well as for any other CORESETs that are defined through a commonControlResourceSet information element (IE). Note that for CORESET0 defined by MIB, the pdcch-DMRS-ScramblingID=Cell ID, whereas for CORESETs defined by PDCCH-ConfigCommon, pdcch-DMRS-ScramblingID={0 to 65535}. Therefore, the BS 320 may select a unique value for pdcch-DMRS-ScramblingID in order to mitigate interference in PDCCH DMRS symbols.

In some aspects, the extracted information includes a paging frame and/or slots used by the BS 310, and the BS 320 may select paging occasions with a paging frame and/or slots that are non-overlapping with the paging frame and/or slots used by the BS 310. The paging frame and/or slots may be extracted from PDCCH-Config (a paging configuration from SIB1). With reference to TS 38.304, section 7.1, paging occasions may be a set of PDCCH monitoring occasions and may include multiple time slots where paging DCI may be transmitted. A paging frame may be a radio frame that includes one or more paging occasions or a starting point of a paging occasion. In other words, the BS 320 may determine a paging SFN/slot configuration used by the BS 310. By selecting appropriate values for a frame offset and/or a periodicity, the BS 320 may select non-overlapping slots for paging. The SIB1 may include paging information. For example, in SIB1→DownlinkConfigCommonSIB→PDCCH-Config may include defaultPagingCycle (default paging cycle), nAndPagingFrameOffset (used to derive a number of total paging frames), ns (a number of paging occasions in a paging frame), andfirstPDCCH-MonitoringOccasionOfPO (indicates a first PDCCH monitoring occasion of each paging occasion (PO) in a paging frame (PF)).

As shown by reference number 360, the BS 320 may transmit a communication with the selected resources. By extracting information from neighboring base stations (e.g., CORESET locations, a scrambling ID, a DMRS Type A position, a paging configuration), a small cell 5G NR base station may select resources to avoid interference and collisions. The small cell 5G NR base station may cause the small cell 5G NR base station and neighboring base stations to conserve processing resources and signaling resources that would otherwise be consumed by failed communications and retransmissions.

Figure 4:
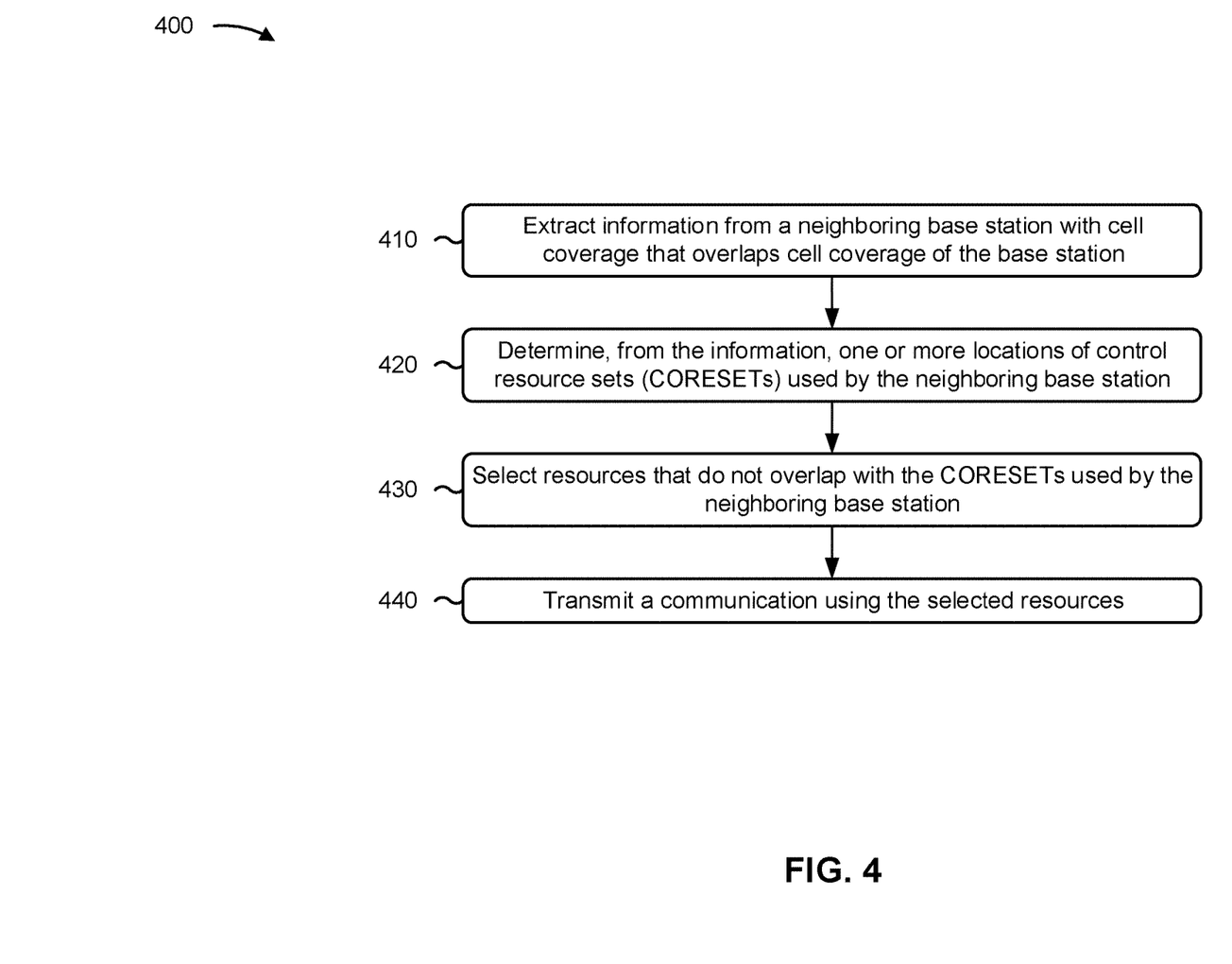
FIG. 4 is a diagram illustrating an example process performed, for example, by a base station, in accordance with the present disclosure.

FIG. 4 is a diagram illustrating an example process 400 performed, for example, by a base station, in accordance with the present disclosure. Example process 400 is an example where the base station (e.g., base station 110*e*) performs operations associated with selecting base station resources.

As shown in FIG. 4, in some aspects, process 400 may include extracting information from a neighboring base station with cell coverage that overlaps cell coverage of the base station (block 410). For example, the base station (e.g., using reception component 502 depicted in FIG. 5) may extract information from a neighboring base station with cell coverage that overlaps cell coverage of the base station, as described above.

As further shown in FIG. 4, in some aspects, process 400 may include determining, from the information, one or more locations of CORESETs used by the neighboring base station (block 420). For example, the base station (e.g., using selection component 508 depicted in FIG. 5) may determine, from the information, one or more locations of CORESETs used by the neighboring base station, as described above.

As further shown in FIG. 4, in some aspects, process 400 may include selecting resources that do not overlap with the CORESETs used by the neighboring base station (block 430). For example, the base station (e.g., using selection component 508 depicted in FIG. 5) may select resources that do not overlap with the CORESETs used by the neighboring base station, as described above.

As further shown in FIG. 4, in some aspects, process 400 may include transmitting a communication using the selected resources (block 440). For example, the base station (e.g., using transmission component 504 depicted in FIG. 5) may transmit a communication using the selected resources, as described above.

Process 400 may include additional aspects, such as any single aspect or any combination of aspects described below and/or in connection with one or more other processes described elsewhere herein.

In a first aspect, the base station is an 5G NR base station.

In a second aspect, alone or in combination with the first aspect, the base station is a small cell base station.

In a third aspect, alone or in combination with one or more of the first and second aspects, the extracting the information includes performing an NL scan or receiving information through an interface or an IAB.

In a fourth aspect, alone or in combination with one or more of the first through third aspects, the selecting the resources includes selecting slots that are non-overlapping with slots of the CORESETs used by the neighboring base station.

In a fifth aspect, alone or in combination with one or more of the first through fourth aspects, the selecting the resources includes selecting one or more SSB indices associated with the slots that are non-overlapping with the slots of the CORESETs.

In a sixth aspect, alone or in combination with one or more of the first through fifth aspects, the selecting the resources includes selecting symbols that are non-overlapping with symbols of the CORESETs used by the neighboring base station.

In a seventh aspect, alone or in combination with one or more of the first through sixth aspects, the selecting the resources includes selecting RBs that are non-overlapping with RBs of the CORESETs used by the neighboring base station.

In an eighth aspect, alone or in combination with one or more of the first through seventh aspects, the selecting the resources includes selecting a different GSCN for an SSB.

In a ninth aspect, alone or in combination with one or more of the first through eighth aspects, the information includes a DMRS Type A position used by the neighboring base station, and the selecting the resources includes selecting a DMRS Type A position for the base station that aligns with the DMRS Type A position used by the neighboring base station.

In a tenth aspect, alone or in combination with one or more of the first through ninth aspects, the information includes one or more of a PDCCH DMRS scrambling ID, a resource block allocation, a slot, or symbols used by the neighboring base station in a PDCCH common configuration, and wherein the selecting the resources includes selecting one or more of a PDCCH DMRS scrambling ID, a resource block allocation, a slot, or symbols that are different than the one or more of the PDCCH DMRS scrambling ID, the resource block allocation, the slot, or the symbols used by the neighboring base station.

In an eleventh aspect, alone or in combination with one or more of the first through tenth aspects, the information includes one or more of a paging frame or slots used by the neighboring base station, and the selecting the resources includes selecting paging occasions with one or more of a paging frame or slots that are non-overlapping with the one or more of the paging frame or slots used by the neighboring base station.

In a twelfth aspect, alone or in combination with one or more of the first through eleventh aspects, the extracting the information includes using MIB information to identify SIB1 information associated with the neighboring base station, and the SIB1 information includes one or more of a frequency band indicator, a duplex mode, SSB indices, an offset between a CRB and a lowest resource block of an SSB, a frequency offset between a lowest subcarrier of the CRB and a lowest usable subcarrier, a subcarrier spacing, or a carrier bandwidth.

In a thirteenth aspect, alone or in combination with one or more of the first through twelfth aspects, the locations of the CORESETs include a location of the CORESET0, where the determining the location of the CORESET0 of the neighboring base station includes determining a subcarrier offset between the lowest subcarrier of the CRB to a lowest subcarrier of the SSB based at least in part on the MIB information and the SIB1 information, detecting whether the CORESET0 used by the neighboring station is present based at least in part on the subcarrier offset, a frequency range of operation of the neighboring base station, and a frequency range of operation of the base station, and determining the location of the CORESET0 used by the neighboring station based at least in part on the subcarrier offset, if the CORESET0 used by the neighboring station is present.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
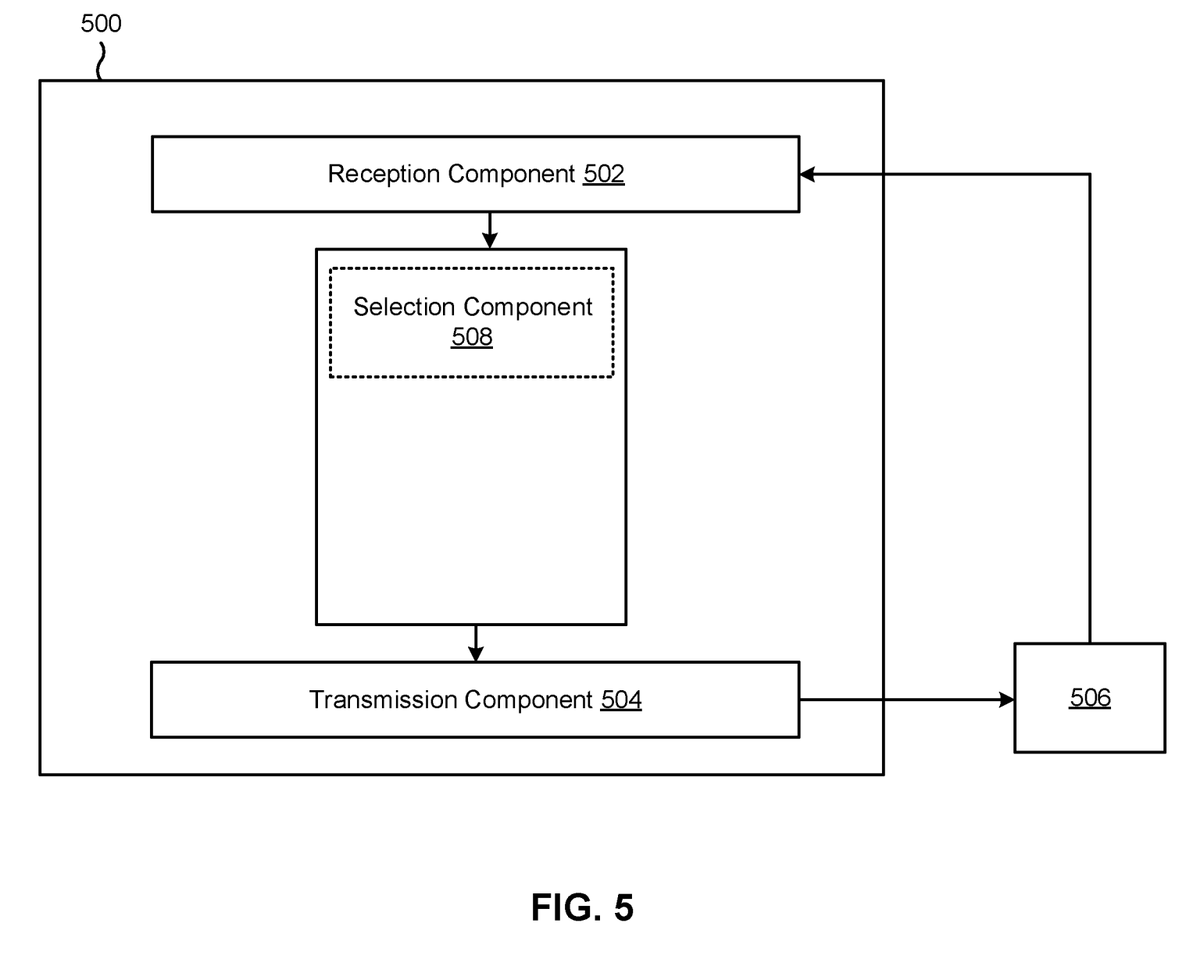
FIG. 5 is a block diagram of an example apparatus for wireless communication, in accordance with the present disclosure.

FIG. 5 is a block diagram of an example apparatus 500 for wireless communication. The apparatus 500 may be a base station (e.g., a 5G NR small cell base station, or a base station may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a neighboring base station (e.g., macro BS), or another wireless communication device) using the reception component 502 and the transmission component 504. As further shown, the apparatus 500 may include a selection component 508, among other examples.

In some aspects, the apparatus 500 may be configured to perform one or more operations described herein in connection with FIGS. 1-3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the base station described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, memory, or a combination thereof, of the base station described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, memory, or a combination thereof, of the base station described above in connection with FIG. 2. In some aspects, the transmission component 504 may be co-located with the reception component 502 in a transceiver.

The reception component 502 may extract information from a neighboring base station with cell coverage that overlaps cell coverage of the base station. The selection component 508 may determine, from the information, one or more locations of CORESETs used by the neighboring base station. The selection component 508 may select resources that do not overlap with the CORESETs used by the neighboring base station. The transmission component 504 may transmit a communication using the selected resources.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a base station, comprising: extracting information from a neighboring base station with cell coverage that overlaps cell coverage of the base station; determining, from the information, one or more locations of control resource sets (CORESETs) used by the neighboring base station; selecting resources that do not overlap with the CORESETs used by the neighboring base station; and transmitting a communication using the selected resources.

Aspect 2: The method of Aspect 1, wherein the base station is a 5G New Radio base station.

Aspect 3: The method of Aspect 1 or 2, wherein the base station is a small cell base station.

Aspect 4: The method of any of Aspects 1-3, wherein the extracting the information includes performing a network listening scan or receiving information through an interface or an integrated access backhaul.

Aspect 5: The method of any of Aspects 1-4, wherein the selecting the resources includes selecting slots that are non-overlapping with slots of the CORESETs used by the neighboring base station.

Aspect 6: The method of Aspect 5, wherein the selecting the resources includes selecting one or more synchronization signal block (SSB) indices associated with the slots that are non-overlapping with the slots of the CORESETs.

Aspect 7: The method of any of Aspects 1-6, wherein the selecting the resources includes selecting symbols that are non-overlapping with symbols of the CORESETs used by the neighboring base station.

Aspect 8: The method of any of Aspects 1-7, wherein the selecting the resources includes selecting resource blocks that are non-overlapping with resource blocks of the CORESETs used by the neighboring base station.

Aspect 9: The method of any of Aspects 1-8, wherein the selecting the resources includes selecting a different global synchronization channel number for a synchronization signal block.

Aspect 10: The method of any of Aspects 1-9, wherein the information includes a demodulation reference symbol (DMRS) Type A position used by the neighboring base station, and wherein the selecting the resources includes selecting a DMRS Type A position for the base station that aligns with the DMRS Type A position used by the neighboring base station.

Aspect 11: The method of any of Aspects 1-10, wherein the information includes one or more of a physical downlink control channel (PDCCH) demodulation reference symbol (DMRS) scrambling identifier (ID), a resource block allocation, a slot, or symbols used by the neighboring base station in a PDCCH common configuration, and wherein the selecting the resources includes selecting one or more of a PDCCH DMRS scrambling ID, a resource block allocation, a slot, or symbols that are different than the one or more of the PDCCH DMRS scrambling ID, the resource block allocation, the slot, or the symbols used by the neighboring base station.

Aspect 12: The method of any of Aspects 1-11, wherein the information includes one or more of a paging frame or slots used by the neighboring base station, and wherein the selecting the resources includes selecting paging occasions with one or more of a paging frame or slots that are non-overlapping with the one or more of the paging frame or slots used by the neighboring base station.

Aspect 13: The method of any of Aspects 1-12, wherein the extracting the information includes using master information block (MIB) information to identify system information block one (SIB1) information associated with the neighboring base station, and wherein the SIB1 information includes one or more of a frequency band indicator, a duplex mode, synchronization signal block indices, an offset between a common resource block (CRB) and a lowest resource block of an SSB, a frequency offset between a lowest subcarrier of the CRB and a lowest usable subcarrier, a subcarrier spacing, or a carrier bandwidth.

Aspect 14: The method of Aspect 13, wherein the one or more locations of the CORESETs include a location of the CORESET zero (CORESET0), wherein the determining the location of the CORESET0 of the neighboring base station includes: determining a subcarrier offset between the lowest subcarrier of the CRB to a lowest subcarrier of the SSB based at least in part on the MIB information and the SIB1 information; detecting whether the CORESET0 used by the neighboring station is present based at least in part on the subcarrier offset, a frequency range of operation of the neighboring base station, and a frequency range of operation of the base station; and determining the location of the CORESET0 used by the neighboring station based at least in part on the subcarrier offset, if the CORESET0 used by the neighboring station is present.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device for wireless communication, comprising:
   memory; and
   one or more processors coupled to the memory, the memory including instructions executable by the one or more processors to cause the network device to:
   extract information from a neighboring network device with cell coverage that overlaps cell coverage of the network device, wherein the information includes one or more of a physical downlink control channel (PDCCH) demodulation reference signal (DMRS) scrambling identifier (ID), a resource block allocation, a slot, or symbols used by the neighboring network device in a PDCCH common configuration;
   determine, from the information, one or more locations of control resource sets (CORESETs) used by the neighboring network device;
   select resources that do not overlap with the CORESETs used by the neighboring network device, wherein the resources comprise one or more of a PDCCH DMRS scrambling ID, a resource block allocation, a slot, or symbols that are different than the one or more of the PDCCH DMRS scrambling ID, the resource block allocation, the slot, or the symbols used by the neighboring network device; and
   transmit a communication using the selected resources.

2. The network device of claim 1, wherein the network device is a 5G New Radio base station.

3. The network device of claim 1, wherein the network device is a small cell base station.

4. The network device of claim 1, wherein the memory further comprises instructions executable by the one or more processors to cause the network device to, when extracting the information, perform a network listening scan or receiving information through an interface or an integrated access backhaul.

5. The network device of claim 1, wherein the memory further comprises instructions executable by the one or more processors to cause the network device to, when selecting the resources, select slots that are non-overlapping with slots of the CORESETs used by the neighboring network device.

6. The network device of claim 5, wherein the memory further comprises instructions executable by the one or more processors to cause the network device to, when selecting the resources, select one or more synchronization signal block (SSB) indices associated with the slots that are non-overlapping with the slots of the CORESETs used by the neighboring network device.

7. The network device of claim 1, wherein the memory further comprises instructions executable by the one or more processors to cause the network device to, when selecting the resources, select symbols that are non-overlapping with symbols of the CORESETs used by the neighboring network device.

8. The network device of claim 1, wherein the memory further comprises instructions executable by the one or more processors to cause the network device to, when selecting the resources, select resource blocks that are non-overlapping with resource blocks of the CORESETs used by the neighboring network device.

9. The network device of claim 1, wherein the memory further comprises instructions executable by the one or more processors to cause the network device to, when selecting the resources, select a different global synchronization channel number for a synchronization signal block.

10. The network device of claim 1, wherein the information includes a demodulation reference symbol (DMRS Type A position used by the neighboring network device, and wherein the memory further comprises instructions executable by the one or more processors to cause the network device to, when selecting the resources, select a DMRS Type A position for the network device that aligns with the DMRS Type A position used by the neighboring network device.

11. The network device of claim 1, wherein the information includes one or more of a paging frame or slots used by the neighboring network device, and wherein the memory further comprises instructions executable by the one or more processors to cause the network device to, when selecting the resources, select paging occasions with one or more of a paging frame or slots that are non-overlapping with the one or more of the paging frame or slots used by the neighboring network device.

12. The network device of claim 1, wherein the memory further comprises instructions executable by the one or more processors to cause the network device to, when extracting the information, use master information block (MIB) information to identify system information block one (SIB1) information associated with the neighboring network device, and wherein the SIB1 information includes one or more of a frequency band indicator, a duplex mode, synchronization signal block indices, an offset between a common resource block (CRB) and a lowest resource block of an SSB, a frequency offset between a lowest subcarrier of the CRB and a lowest usable subcarrier, a subcarrier spacing, or a carrier bandwidth.

13. The network device of claim 12, wherein the one or more locations of the CORESETs include a location of the CORESET zero (CORESET0), and wherein the memory further comprises instructions executable by the one or more processors to cause the network device to, when determining the location of the CORESET0 of the neighboring network device:
   determine a subcarrier offset between the lowest subcarrier of the CRB to a lowest subcarrier of the SSB based at least in part on the MIB information and the SIB1 information;
   detect whether the CORESET0 used by the neighboring network device is present based at least in part on the subcarrier offset, a frequency range of operation of the neighboring network device, and a frequency range of operation of the network device; and
   determine the location of the CORESET0 used by the neighboring network device based at least in part on the subcarrier offset, if the CORESET0 used by the neighboring network device is present.

14. A method of wireless communication performed by a network device, comprising:

extracting information from a neighboring network device with cell coverage that overlaps cell coverage of the network device, wherein the information includes one or more of a physical downlink control channel (PDCCH) demodulation reference signal (DMRS) scrambling identifier (ID), a resource block allocation, a slot, or symbols used by the neighboring network device in a PDCCH common configuration;

determining, from the information, one or more locations of control resource sets (CORESETs) used by the neighboring network device;

selecting resources that do not overlap with the CORESETs used by the neighboring network device, wherein the resources comprise one or more of a PDCCH DMRS scrambling ID, a resource block allocation, a slot, or symbols that are different than the one or more of the PDCCH DMRS scrambling ID, the resource block allocation, the slot, or the symbols used by the neighboring network device; and transmitting a communication using the selected resources.

15. The method of claim 14, wherein the network device is a 5G New Radio base station.

16. The method of claim 14, wherein the network device is a small cell base station.

17. The method of claim 14, wherein the extracting the information includes performing a network listening scan or receiving information through an interface or an integrated access backhaul.

18. The method of claim 14, wherein the selecting the resources includes selecting slots that are non-overlapping with slots of the CORESETs used by the neighboring network device.

19. The method of claim 18, wherein the selecting the resources includes selecting one or more synchronization signal block (SSB) indices associated with the slots that are non-overlapping with the slots of the CORESETs used by the neighboring network device.

20. The method of claim 14, wherein the selecting the resources includes selecting symbols that are non-overlapping with symbols of the CORESETs used by the neighboring network device.

21. The method of claim 14, wherein the selecting the resources includes selecting resource blocks that are non-overlapping with resource blocks of the CORESETs used by the neighboring network device.

22. The method of claim 14, wherein the selecting the resources includes selecting a different global synchronization channel number for a synchronization signal block.

23. The method of claim 14, wherein the information includes a DMRS Type A position used by the neighboring network device, and wherein the selecting the resources includes selecting a DMRS Type A position for the network device that aligns with the DMRS Type A position used by the neighboring network device.

24. The method of claim 14, wherein the information includes one or more of a paging frame or slots used by the neighboring network device, and wherein the selecting the resources includes selecting paging occasions with one or more of a paging frame or slots that are non-overlapping with the one or more of the paging frame or slots used by the neighboring network device.

25. The method of claim 14, wherein the extracting the information includes using master information block (MIB) information to identify system information block one (SIB1) information associated with the neighboring network device, and wherein the SIB1 information includes one or more of a frequency band indicator, a duplex mode, synchronization signal block indices, an offset between a common resource block (CRB) and a lowest resource block of an SSB, a frequency offset between a lowest subcarrier of the CRB and a lowest usable subcarrier, a subcarrier spacing, or a carrier bandwidth.

26. The method of claim 25, wherein the one or more locations of the CORESETs include a location of the CORESET zero (CORESET0), wherein the determining the location of the CORESET0 of the neighboring network device includes:

determining a subcarrier offset between the lowest subcarrier of the CRB to a lowest subcarrier of the SSB based at least in part on the MIB information and the SIB1 information;

detecting whether the CORESET0 used by the neighboring network device is present based at least in part on the subcarrier offset, a frequency range of operation of the neighboring network device, and a frequency range of operation of the network device; and determining the location of the CORESET0 used by the neighboring network device based at least in part on the subcarrier offset, if the CORESET0 used by the neighboring network device is present.

27. A non-transitory computer-readable medium storing one or more instructions for wireless communication, the one or more instructions, when executed by one or more processors of a network device, cause the network device to:

extract information from a neighboring network device with cell coverage that overlaps cell coverage of the network device, wherein the information includes one or more of a physical downlink control channel (PDCCH) demodulation reference signal (DMRS) scrambling identifier (ID), a resource block allocation, a slot, or symbols used by the neighboring network device in a PDCCH common configuration;

determine, from the information, one or more locations of control resource sets (CORESETs) used by the neighboring network device;

select resources that do not overlap with the CORESETs used by the neighboring network device, wherein the resources comprise one or more of a PDCCH DMRS scrambling ID, a resource block allocation, a slot, or symbols that are different than the one or more of the PDCCH DMRS scrambling ID, the resource block allocation, the slot, or the symbols used by the neighboring network device; and transmit a communication using the selected resources.

28. An apparatus for wireless communication, comprising:

means for extracting information from a neighboring network device with cell coverage that overlaps cell coverage of a network device, wherein the information includes one or more of a physical downlink control channel (PDCCH) demodulation reference signal (DMRS) scrambling identifier (ID), a resource block allocation, a slot, or symbols used by the neighboring network device in a PDCCH common configuration;

means for determining, from the information, one or more locations of control resource sets (CORESETs) used by the neighboring network device;

means for selecting resources that do not overlap with the CORESETs used by the neighboring network device, wherein the resources comprise one or more of a PDCCH DMRS scrambling ID, a resource block allocation, a slot, or symbols that are different than the one or more of the PDCCH DMRS scrambling ID, the resource block allocation, the slot, or the symbols used by the neighboring network device; and means for transmitting a communication using the selected resources.

\* \* \* \* \*